United States Patent [19]

Schievelbein

[11] 4,307,782

[45] * Dec. 29, 1981

[54] SURFACTANT WATERFLOODING OIL RECOVERY METHOD

[75] Inventor: Vernon H. Schievelbein, Houston, Tex.

[73] Assignee: Texaco Inc., White Plains, N.Y.

[*] Notice: The portion of the term of this patent subsequent to Mar. 25, 1997, has been disclaimed.

[21] Appl. No.: 145,291

[22] Filed: Apr. 30, 1980

[51] Int. Cl.³ .............................................. E21B 43/22
[52] U.S. Cl. ............................... 166/274; 252/8.55 D
[58] Field of Search ................. 252/8.55 D; 166/274, 166/275

[56] References Cited

U.S. PATENT DOCUMENTS

| | | | |
|---|---|---|---|
| 3,508,612 | 4/1970 | Reisberg et al. | 252/8.55 X |
| 3,811,507 | 5/1974 | Flournoy et al. | 252/8.55 X |
| 3,827,497 | 8/1974 | Dycus et al. | 252/8.55 X |
| 3,858,656 | 1/1975 | Flournoy et al. | 252/8.55 X |
| 4,077,471 | 3/1978 | Shupe et al. | 166/275 |
| 4,079,785 | 3/1978 | Hessert et al. | 252/8.55 X |
| 4,110,229 | 8/1978 | Carlin et al. | 252/8.55 |
| 4,125,156 | 11/1978 | Glinsmann | 166/274 X |
| 4,194,564 | 3/1980 | Schievelbein | 166/274 |

*Primary Examiner*—Herbert B. Guynn
*Attorney, Agent, or Firm*—Carl G. Ries; Robert A. Kulason; Jack H. Park

[57] ABSTRACT

Oil is recovered from an underground petroleum reservoir which contains a brine having a salinity of from 50 to 220 kg/m³ total dissolved solids by injecting an alkylarylpolyalkoxy sulfate or alkylpolyalkoxy sulfate surfactant that exhibits phase stability in the brine or diluted brine. The surfactant is injected in an aqueous solution which is prepared with diluted brine which has a salinity slightly less than that required to cause partitioning of the surfactant out of the aqueous phase into the oil-water interface or oil phase. The injection of surfactant is followed by the injecting of a driving slug comprised of either diluted brine or thickened diluted brine.

13 Claims, No Drawings

SURFACTANT WATERFLOODING OIL RECOVERY METHOD

FIELD OF THE INVENTION

This invention relates to an enhanced oil recovery method which utilizes surfactant fluid prepared to have salinities slightly less than that required to cause redistribution of surfactant from the aqueous phase to the oil-water interface or oil phase. Surfactant mixtures are injected into formations containing brines with higher salinities and are followed by injection of a driving slug of diluted brine with or without polymers. Oil is recovered from production wells.

BACKGROUND OF THE INVENTION

The crude oil which has accumulated in subterranean reservoirs is recovered or produced through one or more wells drilled into the reservoir. Initial production of the crude oil is accomplished by "primary recovery" techniques wherein only the natural forces present in the reservoir are utilized to produce the oil. However upon depletion of these natural forces and the termination of primary recovery, a large portion of the crude oil remains trapped within the reservoir. Also many reservoirs lack sufficient natural forces to be produced by primary methods from the very beginning. Recognition of these facts has led to the development and use of many enhanced oil recovery techniques. Most of these techniques involve injection of at least one fluid into the reservoir to produce an additional amount of the crude oil therefrom. Some of the more common method are water flooding, steam flooding, miscible flooding, $CO_2$ flooding, polymer flooding, surfactant flooding, caustic flooding and in situ combustion.

Water flooding, which involves injection of water into the subterranean oil reservoir for the purpose of displacing the crude oil from the pore spaces of the reservoir rock towards the producing wells is the most economical and widely used of the enhanced oil recovery method. Nevertheless water does not displace oil with high efficiency because of the immiscibility of water and oil and because of the high interfacial tension between them.

Surfactant flooding involves the addition of one or more surface active agents, or surfactants, to the water flood for the purpose of minimizing the water flooding problems mentioned above. This has been an area of active interest in the art of enhanced oil recovery methods for many years. For example in 1941, U.S. Pat. No. 2,233,381 disclosed the use of polyglycol ether as a surfactant which increases the capillary displacement efficiency of an aqueous flood. U.S. Pat. No. 3,302,713 discloses the use of petroleum sulfonates as effective surfactants in oil recovery operations. Other surfactants proposed for use in oil recovery processes include alkylpyridinium salts, alkyl sulfates, alkylaryl sulfates, ethoxylated alkyl or alkylaryl sulfates, alkyl sulfonates, alkylaryl sulfonates and quaternary ammonium salts.

While the above surfactants may be effective under ideal conditions, there are problems concerned with the use of each in most petroleum reservoirs. Some of the most serious problems arise from the effects of reservoir fluid salinity on the injected surfactant, the most common being precipitation and resultant loss of the surfactant. Mixtures of different types of surfactants, such as anionic and non-ionic, are employed in many prior art techniques to achieve a higher salinity tolerance for the mixture. However, even this is not entirely satisfactory because as the mixture is driven through the formation, one of the components is often preferentially adsorbed to the mineral grains in the formation matrices, causing a change in the relative concentration of the surfactant components and resulting in a failure to maintain effective salinity tolerance.

Another serious problem concerns the vertical conformance efficiency of a surfactant flooding operation. Most reservoirs display significant permeability variations throughout their volumes causing fluids to flow preferentially through the high permeability sections, leaving portions of the reservoir with lower permeabilities essentially isolated from the effects of the injected fluids. The solution of this problem is thought to lie in selectively plugging the higher permeability streaks in order that the injected fluids be then forced into the previously unswept lower permeability portions of the reservoir. Several solutions of this problem have been proposed, but none have proved to be entirely successful. It is felt that most of these proposed solutions only affect a region relatively close to the injection well bore. The most effective process would appear to be a technique that is continuous with the entirely of the surfactant injection cycle and would contact all but the very lowest permeability elements of the total reservoir volume.

It can be readily seen that there remains a substantial need for a surfactant flooding process that will perform effectively in a high salinity reservoir environment while displaying a high vertical conformance efficiency.

PRIOR ART

U.S. Pat. No. 4,194,564 discloses a surfactant waterflooding oil recovery method employing an alkylarylpolyalkoxyalkylene sulfonate in a fluid having salinity slightly less than that required to cause partitioning of the surfactant out of the aqueous phase into the oil-water interface or into the oil phase. U.S. Pat. Nos. 3,888,308; 3,506,612, and 3,811,507 describe oil recovery processes employing aqueous fluids containing alkylpolylthoxy sulfate or alkylarylpolyethoxy sulfate. SPE paper 8824, to be presented at the SPE meeting in Tulsa, Oklahoma, Apr. 20, 1980, "Salinity Requirement Diagram—a useful Tool in Chemical Research & Development" by R. C. Nelson Shell Development, and SPE paper 8825 "Evaluation of the Salinity Gradient Concept in Surfactant Flooding" by G. J. Herasaki and R. C. Nelson of Shell Dev. Co and H. R. Van Domselvar of Shell Exploration Co., are also related references.

SUMMARY OF THE INVENTION

This invention involves an enhanced oil recovery process useful in reservoirs containing fluids having a salinity ranging from 50 to 220 kg/m$^3$ dissolved solids. The process includes mixing an alkylarylpolyalkoxy sulfate or alkylpolyalkoxy sulfate with a brine and sufficient fresh water to produce a fluid mixture whose salinity is slightly below the salinity level at which the surfactant will partition out of the aqueous phase and into the oil-water interface or the oil phase. The injected surfactant is followed by a driving slug of thickened diluted brine or diluted brine.

DESCRIPTION OF THE PREFERRED EMBODIMENTS

The method of this invention is employed in high salinity petroleum reservoirs having from 50 to 220 kg/m$^3$ dissolved solids. The surfactant mixture as injected is designed to partition into the oil phase of reservoir fluid mixture upon contact with the high salinity reservoir fluids and then partition back into the aqueous phase when contacted with increasing amounts of the lower salinity fluids of the continuing surfactant flood and the following polymer flood. The utilization of this salinity gradient technique has been demonstrated to recover very substantial amounts of oil not recoverable by water flooding alone and to provide an effective measure of vertical conformance control in very high salinity environments.

It is anticipated that this process would find its most frequent use in reservoirs that have already been water flooded with high salinity brines. Nevertheless, the process would also be effective in reservoirs containing high salinity natural brines that have been water flooded.

The surfactant for use in this process is an alkylpolyalkoxy sulfate or alkylarylpolyalkoxy sulfate. Typical surfactants have the following formula:

$$RO(R'O)_nSO_3^-X^+$$

wherein R is a $C_8$ to $C_{22}$ and preferably $C_{12}$ to $C_{18}$ alkyl, linear or branched, or an alkylaryl group such as benzene, toluene or xylene having attached thereto at least one $C_6$ to $C_{18}$ and preferably $C_8$ to $C_{15}$ alkyl group, linear or branched, R' is ethylene or a mixture of ethylene and propylene or other high alkylene group with relatively more ethylene than higher alkylene, n is a number from 1 to 12 and preferably from 3 to 8 representing the average number of alkylene oxide units, S is sulfur, O is oxygen, and X is monovalent cation preferably sodium, potassium, lithium, or ammonium.

The alkyl or alkylarylpolyalkoxy sulfate may be used alone as essentially the only surfactant in the surfactant fluid. In another embodiment, the alkoxy sulfate is used as a solubilizing co-surfactant in combination with from 0.5 to 10.0 percent of an organic sulfonate, preferably a petroleum sulfonate having average equivalent weight in the range of 350 to 450.

First, a suitable alkylarylpolyalkoxy sulfate or alkylpolyalkoxy sulfate is selected by testing it for stability. This is done by mixing the surfactant and, optionally, a small amount of crude oil or a distilled fraction thereof with the high salinity reservoir brine or the brine diluted with fresh water. A suitable surfactant will not precipitate or separate as a surfactant-rich layer from the brine.

Tests are then run to optimize the salinity for the surfactant solution. Partitioning data have been found to be particularly useful in this respect, with the most desirable surfactant solution salinity being at a level slightly lower than the salinity at which approximately one-half of the surfactant partitions from the aqueous phase into oil and emulsion phases. The surfactant solution is then made up comprising the surfactant, brine, and fresh water and, optionally, additives such as sacrificial agents and polymers. This solution is then injected into the petroleum reservoir. The surfactant slug is followed by a driving slug comprising either a brine or a brine-polymer solution of approximately the same salinity as the surfactant slug. The petroleum is then recovered from production wells in the reservoir.

While the above tests relate to identifying the salinity less than that at which 50% of the surfactant partions into the oil phase or oil-water interface, it is within the scope of this invention to use salinity from 5.0 to 20% less than the salinity at which from 50 to 60% of the surfactant partions from the water phase to the oil-water interface or to the oil phase.

The concentration of the surfactant as used in the process of this invention will vary generally depending on the particular surfactant chosen for use, as well as the water salinity and hardness. It is highly preferred that the optimum response at various concentrations be measured under conditions simulating those which will be present in the reservoir, and the concentration corresponding to the optimum surfactant performance characteristic be identified in this manner. Generally the concentration of the alkylarylpolyalkoxy sulfate or alkylpolyalkoxy sulfate will be from about 0.05 to about 10.0 percent by weight and preferably from about 0.1 to about 5.0 percent by weight.

The volume of the surfactant slug can vary from about 2 to about 75 pore volume percent, and is preferably from about 10 to about 50 pore volume percent. It is anticipated that the injected volume of surfactant solution would be optimized at the most economically efficient level.

The surfactant solution may be displaced through the formation by injecting brine, or it may be followed immediately by a quantity of thickened water such as one formed by mixing a small amount of a hydrophilic polymer such as polyacrylamide or polysaccharide in brine. In either case, the displacing fluid should have a salinity at a level where the surfactant repartitions from the oil-water interface or oil phase to the aqueous phase. Generally from about 5 to about 50 pore volume percent of an aqueous solution containing from about 0.01 to about 1.0 percent by weight of hydrophilic polymer is used. This would normally be followed by water injection until the water-oil ratio of the produced fluid increases to the point where further water injection is uneconomical.

The following is proposed as a possible explanation for the success of the method of this invention in recovering petroleum from high salinity reservoir environments. As the surfactant solution is injected, it mixes with the higher salinity reservoir brine. The surfactant is then forced by this higher salinity to the oil-water interface or into the oil phase where the surfactant can more efficiently participate in the oil recovery process. The surfactant is then either displaced with the moving brine and oil or remains stationary as an immobile oil or emulsion phase. Low salinity brine, in both the surfactant and polymer slugs, continues to be injected however, and the immobile fluids are subjected to ever decreasing salinity. Ultimately, the salinity will decrease to the point where the surfactant can partition back into the aqueous phase. The surfactant is then displaced further into the reservoir where it will again encounter the higher salinity brine, and the process will repeat itself and recover additional oil. Pressure measurements during injection of the surfactant solution also indicate that the emulsions which are formed plug the higher permeability channels in the reservoir medium and so act to increase the sweep efficiency of the process.

The salinity gradient process disclosed herein should be distinguished from other salinity gradient techniques known in the art. These known processes invariably employ a salinity gradient between the surfactant slug and the driving fluid whereas the instant invention utilizes the salinity gradient between the formation fluids and the injected surfactant slug.

Reference is now made to the following examples which will serve to illustrate the invention more fully. The invention should, however, not be deemed as limited to these examples.

EXAMPLE I

An series of three di-alkylaryl polyethoxy sulfates of the formula:

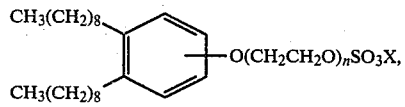

where X is a cation and n was 4.4, 5.3 and 6.5 were prepared in the laboratory. These surfactants, hereinafter surfactant A B or C, demonstrated phase stability when mixed with an oil field brine and diluted oil field brine as well as with deionized water. This reservoir brine has a salinity of about 85 kg/m$^3$ total dissolved solids (TDS).

Partitioning data was obtained by mixing 25 cm$^3$ of 10 kg/m$^3$ solutions of surfactant A, B and C at different salinity levels with 5 cm$^3$ of field crude oil in a 43° C. wheel oven for 24 hours, and then centrifuged to separate the phases. The aqueous phase was analyzed for surfactant remaining in the aqueous phase. The value, is compared to the initial concentration, and is reported in Table I for each surfactant. The values show that at high salinities most of the surfactant partitions into oil emulsion phases.

TABLE I

| | SURFACTANT PARTITIONING v. SALINITY | | |
|---|---|---|---|
| | Surfactant Partitioning C/Co | | |
| Salinity Kg/M$^3$ | A n = 4.4 | B n = 5.3 | C n = 6.5 |
| 0 | .97 | .97 | .93 |
| 9 | .97 | .95 | .91 |
| 18 | .95 | .89 | .91 |
| 27 | .91 | .30 | .80 |
| 36 | .83 | .02 | .90 |
| 45 | .70 | .03 | .92 |
| 54 | .50 | .01 | .94 |
| 63 | .03 | .01 | .72 |
| 72 | .02 | .01 | .55 |
| 81 | .01 | .01 | .54 |
| 90 | .01 | .01 | .01 |

Based on these and related data, the salinity environments for the three surfactants for effective oil recoveries should be as follows:

TABLE II

| Surfactant | Salinity |
|---|---|
| A: n = 4.4 | <54 kg/m$^3$ |
| B: n = 5.3 | <26 kg/m$^3$ |
| C: n = 6.5 | <75 kg/m$^3$ |

Berea cores, 5.08 cm in diameter and 15-23 cm in length, were cleaned by successive water, isopropyl alcohol, toluene, isopropyl alcohol and water throughputs. The cores were then dried and saturated with oilfield brine and crude oil thinned with 0.25 m$^3$/m$^3$ heptane to match reservoir viscosity. The cores were then water flooded to irreducible water flood oil saturation with the oil field brine.

Core floods were conducted in 17-20 cm long Berea cores using crude oil thinned with 25% by volume heptane. The cores contained undiluted field brine (85,000 ppm) when the tertiary floods were initiated. The salinities listed in Tables III and IV are the surfactant solution and final water drive salinities. Within the cores, the surfactant solution and waterflood water mix; therefore the surfactant may be in a salinity environment, temporarily, intermediate between field brine and injected salinity.

The continuous surfactant floods demonstrated that surfactantes A, B and C are good enhanced oil recovery chemicals. With any of the given surfactants, tertiary oil recoveries were highest when the above-stated salinity requirements were met.

TABLE III

| CONTINUOUS SURFACTANT FLOODS | | | | |
|---|---|---|---|---|
| SURFACTANT | SALINITY kg/m$^3$ | RATE Meters Per day | $E_R$ m$^3$/m$^3$ | $\Delta P/\Delta Pwf^1$ |
| C(n = 6.5) | 85 | 0.3 | 0.71 | 6.3 |
| C(n = 6.5) | 64 | 1.0 | 0.65 | 3.3 |
| C(n = 6.5) | 42.5 | 1.0 | 0.42 | 2.3 |
| B(n = 5.8) | 85 | 0.3 | 0.68 | 10.0 |
| B(n = 5.8) | 17 | 1.0 | 0.46 | 5.0 |
| A(n = 4.4) | 56 | 1.0 | 0.60 | 5.4 |
| A(n = 4.4) | 42.5 | 0.3 | 0.31 | — |

After considering the tertiary oil recoveries and pressure histories ($\Delta P/\Delta Pwf$ after $2V_p$ surfactant injection), surfactant C was selected for slug flood evaluation.

The slug floods were conducted with a 0.3 meter per day displacement rate, 12-17 kg/m$^3$ active surfactant concentration, 0.5 $V_p$ surfactant slug size and water drive (no polymer additives). The data are given in Table IV below. Tertiary oil recovery response was early and very high oil cuts were achieved. The pressure history is also typical of the floods and is somewhat objectionable because of the continuous rise during displacement with brine.

TABLE IV

| SURFACTANT C SLUG FLOODS | | |
|---|---|---|
| SURFACTANT CONC., kg/m$^3$ | SALINITY kg/m$^3$ | $E_R$ m$^3$/m$^3$ |
| 12-16$^1$ | 64 | 0.77 |
| 16.9 | 64 | 0.84 |
| 12.0 | 54 | 0.66 |
| 11.4 | 42.5 | 0.60 |

$^1$Concentration not known accurately, but is in this range.

The above data clearly illustrates that the alkylarylpolyalkoxy sulfate or alkylpolyalkoxy sulfate surfactants produce excellent enhanced oil recovery when used in an aqueous fluid having salinity selected according to my invention.

While my invention has been described in terms of a number of illustrative examples, it is not so limited since many variations thereof will be apparent to persons skilled in the art of surfactant waterflooding enhanced oil recovery techniques without departing from the true spirit and scope of my invention. It is my desire and intention that my invention be limited and restricted only by the limitations and restrictions appearing in the claims below.

I claim:

1. A process for recovering petroleum from an underground permeable reservoir wherein the reservoir is penetrated by at least one injection well and at least one spaced-apart production well, said wells being in fluid communication with said reservoir, and wherein the reservoir contains a brine with from 50 to 220 kg/m³ salinity comprising:
   a. preparing a surfactant solution wherein the surfactant is an alkylarylpolyalkoxy sulfate or alkylpolyalkoxy sulfate of the formula $$RO(R'O)_m SO_3 X$$

wherein R is a $C_8$ to $C_{22}$ alkyl or an alkylaryl selected from the group consisting of alkylbenzene, dialkylbenzene, trialkylbenzene, alkyl toluene and dialkyl toluene with each alkyl group containing from 6 to 18 carbon atoms; R' is ethylene or a mixture of ethylene and propylene with relatively more ethylene than propylene; m is a number from 1 to 12 and X is a cation, said surfactant exhibiting phase stability when mixed with small amounts of crude oil or distilled fractions thereof and a brine, said surfactant solution having a salinity less than that of the reservoir brine and comprising from about 0.05 to 10.0 percent by weight surfactant and a brine or diluted brine having a salinity from 5 to 20 percent less than the salinity required to produce partitioning of from forty to sixty percent of the surfactant solution out of the aqueous phase and into the oil and emulsion phases;
   b. injecting the surfactant solution through the injection well into the underground reservoir said surfactant partitioning into the oil phase of the higher salinity reservoir fluid on contact therewith;
   c. injecting a driving agent; and
   d. recovering petroleum from the formation via the production well.

2. A method as recited in claim 1 wherein the surfactant is an alkylarylpolyalkoxy sulfate.

3. A method as recited in claim 2 wherein the alkoxy is ethoxy.

4. A method as recited in claim 1 wherein the surfactant is an alkylpolyethoxy sulfate.

5. A method as recited in claim 1 wherein the surfactant is a dialkylbenzenepolyethoxy sulfate.

6. The process of claim 1 wherein the surfactant solution further comprises an effective amount of a sacrificial agent.

7. The process of claim 1 wherein the surfactant solution further comprises a minimal amount of crude oil or distilled fractions thereof sufficient to stabilize the solution.

8. The process of claim 1 wherein the surfactant solution further comprises an amount of a hydrophilic polymer sufficient to raise the viscosity of the surfactant solution to an effective level.

9. The process of claim 1 wherein the driving agent has approximately the same salinity as the surfactant solution.

10. The process of claim 1 wherein the driving agent comprises brine and an amount of a hydrophilic polymer sufficient to raise the viscosity of the driving agent to an effective level.

11. The process of claim 1 wherein the driving agent comprises brine.

12. The process of claim 1 wherein the surfactant has the formula:

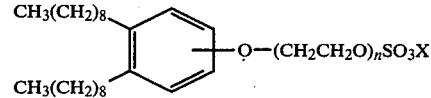

where n is a number from 2 to 8 and X is a cation.

13. The process of claim 1 wherein the fluid also contains from 0.5 to 10.0 percent of petroleum sulfonate.